United States Patent
Freed et al.

(10) Patent No.: US 9,979,692 B2
(45) Date of Patent: May 22, 2018

(54) METHOD AND SYSTEM FOR PROVIDING MESSAGE RECALL FUNCTIONALITY

(71) Applicant: Oracle International Corporation, Redwood Shores, CA (US)

(72) Inventors: Edwin E. Freed, Claremont, CA (US); Kristin Hubner, Mt. Baldy, CA (US); Christopher Newman, Pasadena, CA (US)

(73) Assignee: Oracle International Corporation, Redwood Shores, CA (US)

( * ) Notice: Subject to any disclaimer, the term of this patent is extended or adjusted under 35 U.S.C. 154(b) by 367 days.

(21) Appl. No.: 14/640,926

(22) Filed: Mar. 6, 2015

(65) Prior Publication Data
US 2016/0261549 A1    Sep. 8, 2016

(51) Int. Cl.
*G06F 15/16* (2006.01)
*H04L 12/58* (2006.01)

(52) U.S. Cl.
CPC .............. *H04L 51/34* (2013.01); *H04L 51/18* (2013.01); *H04L 51/26* (2013.01)

(58) Field of Classification Search
CPC .......... H04L 51/34; H04L 51/18; H04L 51/26
USPC ........................................................ 709/206
See application file for complete search history.

(56) References Cited

U.S. PATENT DOCUMENTS

| | | | |
|---|---|---|---|
| 2010/0057869 A1* | 3/2010 | Stavrou | H04L 51/22 709/206 |
| 2012/0198233 A1* | 8/2012 | George | H04L 51/34 713/168 |
| 2015/0058949 A1* | 2/2015 | Collinge | H04L 63/08 726/7 |

* cited by examiner

*Primary Examiner* — Glenton B Burgess
*Assistant Examiner* — Tan Doan
(74) *Attorney, Agent, or Firm* — Jenkins, Wilson, Taylor & Hunt, P.A.

(57) ABSTRACT

The present disclosure provides a method and system for enabling the recall of messages. As an example, the method comprises receiving a message, where the message is created by a sender and configured to be sent to a recipient. The method further comprises identifying a first identifier for the message. The first identifier is configured to verify the sender of the message and enable a recall operation for the message. The recall operation results in the recall of the message, and the recall of the message involves cancelling the transmission of the message to the recipient or deleting the message.

20 Claims, 17 Drawing Sheets

Message Submission by Recall-Capable Client

Message Handling by Server
(in cases of Recall-Capable Client)

Requesting Message Recall
(by Recall-Capable Client)

Processing a Message Recall Request by Server
(in cases of Recall-Capable Client)

Determining whether Message Recall can be performed

Determining whether Message Recall can be performed

Message Submission by Unextended Client

Message Handling by Server
(in cases of Unextended Client)

Message Handling by Server
(in cases of Unextended Client)

Requesting Message Recall
(in cases of Unextended Client)

Processing a Message Recall Request by Server
(in cases of Unextended Client)

Processing a Message Recall Request by Server
(in cases of Unextended Client)

Administrative Recall

METHOD AND SYSTEM FOR PROVIDING MESSAGE RECALL FUNCTIONALITY

FIELD OF THE INVENTION

This invention relates to the recall of messages, and more particularly, to providing message recall functionality.

BACKGROUND OF THE INVENTION

A recall of a message may involve cancelling the transmission of the message to an intended recipient. Typically, a recall of a message is requested by the sender (or creator) of the message. However, verifying the authenticity of the sender can be problematic, and thus hinder the ability to recall the message. In addition, the recall itself is often unreliable and/or unsuccessful.

SUMMARY OF THE INVENTION

The present disclosure provides for enabling the recall of messages. First, a message is received, where the message is created by a sender and configured to be sent to a recipient. Thereafter, a first identifier for the message is identified. The first identifier is configured to verify the sender of the message and enable a recall operation for the message. The recall operation results in the recall of the message, and the recall of the message involves cancelling the transmission of the message to the recipient or deleting the message.

BRIEF DESCRIPTION OF THE DRAWINGS

The present invention may be better understood, and its numerous objects, features and advantages made apparent to those skilled in the art, by referencing the accompanying drawings.

Figure 1A:
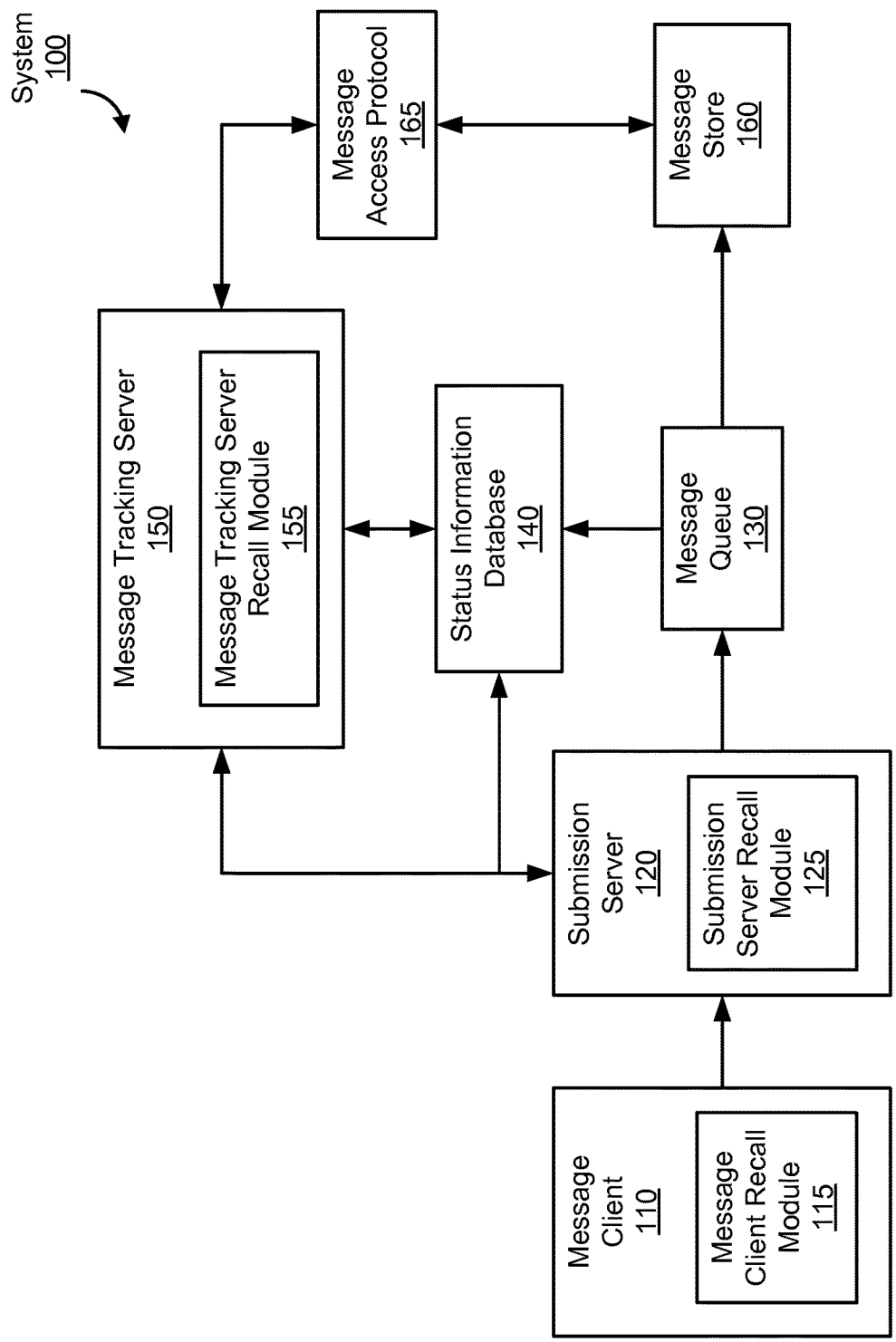
FIG. 1A is a simplified block diagram illustrating components of an example system in which the present disclosure can be implemented, according to one or more embodiments.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intentions are to cover all modifications, equivalents, and alternatives falling within the spirit and scope of the present disclosure as defined by the amended claims.

DETAILED DESCRIPTION

A recall of a message is a process by which the transmission of a message (e.g., an email message) intended for a recipient is cancelled (or, if the message has been delivered, the message is deleted). Such functionality is typically requested by the sender (e.g., the original creator) of the message, though other entities can exert such control (e.g., administrators, administrative software, or the like). As an example, a sender may have accidentally sent a message to the wrong recipient or may have included content in the message that was unintended or inappropriate. In such cases, the sender may seek to recall the message in an effort to avoid having the recipient view or receive any notification regarding the message.

In order to allow a sender to recall a message, the identity of the message and the entity requesting the recall needs to be confirmed. The identity of the message and the entity requesting the recall can be confirmed by authentication and authorization mechanisms, but doing so limits successful recalls to scenarios in which the sender and the recipient are operating within a single administrative domain. In addition, there are also limits to the timing of the recall request (as compared to the speed with which the message is delivered to the recipient). As an example, when a message is transferred to a different administrative domain, the recall request must be made almost immediately after the original message is submitted in order to have a reasonable probability of finding the message locally and thus achieving a successful recall.

Moreover, when operating across administrative domains, performing a recall of a message can be problematic due to security issues (e.g., related to "eavesdropping" during message transfer). This is because information attached to a message (such as identifiers needed for recall purposes) is revealed across domains, which can potentially lead to a premature, malicious, or undesired recall of messages. For example, if recall information is revealed across domains, a user of a first recipient domain could employ the known information to request the recall of a different copy of a message being sent to another recipient in another recipient domain. In addition, traffic analysis concerns can also arise if anyone (e.g., any user) can track (or trigger the occurrence of tracking) for an arbitrary message using the known message information.

FIG. 1A illustrates a messaging system, e.g. system 100, that enables the recall of messages (by simplifying the process by which a sender is verified), increases the likelihood of a successful recall (whether the sender and recipient are operating within a single domain or across multiple domains), and increases the overall security of messages to be recalled. FIG. 1A illustrates an example system 100, in which the present disclosure can be implemented. As shown, system 100 includes message client 110 (which further includes message client recall module 115), submission server 120 (which further includes submission server recall module 125), message queue 130, status information database 140, message tracking server 150 (which further includes message tracking server recall module 155), message store 160, and message access protocol 165.

Message client 110 represents a client (e.g., such as an email client) that can be used by a user (e.g., sender) to generate and transmit messages to one or more recipients. In some cases, message client 110 is capable of creating and storing security identifiers (e.g., security labels that help identify the sender and the message) for enabling recall functionality. In these cases, message client 110 is referred to herein as being recall-capable. However, in other cases, message client 110 is not capable of creating security identifiers needed for enabling recall functionality. In these cases, message client 110 is referred to herein as being an unextended client.

As shown, message client 110 comprises a message client recall module, illustrated as message client recall module 115 (e.g., a module that may or may not be present within client 110). Message client recall module 115, if present, creates security labels for a message, upon creation, and prior to transmission. In the event that message client recall module 115 is not present, these same security labels can be performed by submission server 120, and more specifically by submission server recall module 125. These security labels are unique to a sender and serve to verify the user, identify the message, and allow routing, tracking, and/or the recall of the message. The security labels include a recall identifier, R, a secret identifier, S, and a tracking identifier, T.

The use of R, S, and T serves to increase security for tracking and recall purposes. This is because the use of R, S, and T (and the exposure thereof to a domain) is limited, depending on the type of functionality to be performed for a message. The tracking identifier, T, serves as a label for a message, and on its own, does not permit a domain to perform tracking or recall of a message. As such, T is used when transmitting a message from a sender to a recipient. By contrast, S, is used (and exposed to a domain) if a message is to be tracked within a domain. In cases where a message is to be recalled, R is used (and exposed to a domain). Hence, the type of identifier exposed to a domain is dependent upon the functionality at hand (which prevents premature, undesired, and/or malicious recall of messages by others). In addition, the identifiers are only exposed to the specific domain when and if a tracking or recall operation is requested by an authorized user.

The recall identifier, R, is a randomly generated identifier that is unique to a sender of a message. The recall identifier, R, is transmitted when and if a recall request is made by a sender. Secret identifier, S, is computed by applying a cryptographic hash function (e.g., a hash function that is secure from pre-image attacks) to R. Secret identifier, S, is transmitted when and if a track command is received from a sender. Tracking identifier, T, is computed by applying a second cryptographic hash function to S.

Identifiers R, S, and T, once defined or computed, are used to process messages accordingly. Tracking identifier, T, is stored in the message and serves as a label for the message. In the event that a track command is to be performed, the secret identifier, S, is transmitted to a receiving server, such as submission server 120. The receiving server can hash the S identifier to obtain and verify the T identifier. At this point, the receiving server verifies that the user requesting the track command is authorized to request such a command (given that the S identifier was known to the user and led to the computation of the correct T identifier). Thereafter, the track command can be performed accordingly. In this case, the tracking command can be performed without ever exposing the information (e.g., the R identifier) needed to request, verify, and perform a recall operation.

Alternatively, if a recall operation is to be performed, the R identifier is sent to the receiving server to enable the recall operation. The R identifier is hashed twice by the receiving server to obtain and compare the S and T identifiers, respectively. If the S and T identifiers are correct (e.g., are derived from the R identifier that is known to the original sender of the message), the receiving server confirms that the sender of the recall command is authorized to request the recall operation. The recall information (e.g., R identifier) is exposed in this scenario, given that a recall operation is to be performed.

A recall identifier R, once generated, is saved (by message client 110 and/or submission server 120), along with the message and the message envelope identifier, E. If message client recall module 115 is present and able to create the R, S, and T identifiers for the message, message client 110 is referred to herein as being recall-capable. In some embodiments, however, message client 110 is unextended (e.g., not recall-capable). A message client may not be recall-capable because message client recall module 115 is not present and/or because message client recall module 115 is unable to generate R, S, and T. In such cases, identifiers R, S, and T may be generated by submission server recall module 125 within submission server 120.

Submission server 120 is a server that intakes messages created at message client 110. Submission server 120 receives, routes, delays (if appropriate), and/or cancels the transmission of messages. In the typical case, submission server 120 intakes a message and, typically, immediately routes the message to a recipient, or alternatively, routes the message to another component or domain that will then route the message to the recipient. In the case of a requested delay, submission server 120 delays the transmission of the message for a period equivalent to a hold time, F. A hold time is a period of time, as specified by message client 110, or calculated by submission server 120 (as set by a user, administrator, or the like), during which the message is to be held at submission server 120 (or a related queue, such as message queue 130), prior to further processing. The hold time is optional and may depend upon the type of sender, the type of recipient, the priority of the message, and other parameters.

A delay before delivering or transferring a recallable message may be desirable. This is because a message delay can significantly increase the likelihood of a successful recall. In many cases, a sender detects the need for a message recall shortly after submission. By applying a delay to the transmission of the message, the message is much more likely to be located within a queue (such as message queue 130) at the time a recall command is received from the sender. If the message is in fact located in a queue (such as message queue 130), the recall of the message can be performed successfully and quietly (e.g., without transmission of the message or any notice related thereto to the recipient), which represents the ideal scenario for recalling a message. Alternatively, if no delay is employed, the likelihood of a successful recall is diminished, given that the message is much more likely to have been delivered or a notification regarding the message has already been transmitted to the recipient by the time a recall command is received.

When a recall command is received, submission server 120 conveys the recall command to message tracking server 150, and more particularly to message tracking server recall module 155, via submission server recall module 125. Submission server recall module 125 receives a recall identifier, R, for a message via message client recall module 115, in cases where message client 110 is recall-capable. In cases where message client 110 is not recall-capable, submission server recall module 125 will compute the recall identifier, R, for a message. Once the recall identifier has been computed or identified, the recall identifier is forwarded to message tracking server recall module 155 to initiate the recall of the message. Message tracking server recall module 155 searches status information database 140, using the recall identifier provided by submission server recall module 125, to identify status information pertaining to the message. Once retrieved, the status information can be used by message tracking server 150 to identify the location of the message in question (e.g., to track the message) and subsequently determine whether a message can be successfully recalled.

Status information database 140 receives security parameters from submission server 120 and/or message tracking server 150 and uses such values to maintain a database of status information for messages. As an example, status information database 140 maintains one or more entries, where each entry corresponds to a message. In addition, each entry is indexed according to the message tracking identifier, T, and an envelope identifier, E (which identifies the message itself). When a message is processed or routed in certain embodiments, status information database 140 updates the status information for that message. As an example, status information for a message can be updated when a message is transmitted to a recipient, when an error is encountered in the transmission of the message, when the message is delayed, when the message is routed to another component or domain, and so on.

Status information database 140 is accessible by submission server 120 and/or message tracking server 150 as part of routing the message and/or as part of processing a recall request. When status information for a message is desired, submission server 120 or message tracking server 150 communicate with status information database 140 via submission server recall module 125 or message tracking server recall module 155. Status information can also be reported to message client 110 in response to a track command (submitted by message client 110 via submission server 120), and/or can be used to determine whether a message recall can be successfully performed.

Message queue 130 acts as a repository for messages that are waiting to be processed by submission server 120. Such processing can include routing the message to the recipient, routing the message to another component/domain, recalling the message, and so on. Messages can be stored in message queue 130 for a brief period of time or for a longer period of time, such as in cases where a message includes a hold time. In such cases, messages are held at message queue 130 for a time period equivalent to the hold time, F.

Messages are transferred from message queue 130 to message store 160 using a message transfer protocol. Whenever a message is transferred as such, information within status information database 140 is updated accordingly to help maintain and update status information for each message. Message store 160 acts as a repository of messages. For example, message store 160 can store messages to be accessed by the intended recipient and/or other components. Message access protocol 165 enables the access of messages by the intended recipient and/or other components.

Although not shown, other components may also be part of system 100. For example, system 100 may include additional components such as mail servers, external domains, message clients, and so on, all of which enable the transmission of a message from a sender to a recipient.

Figure 1B:
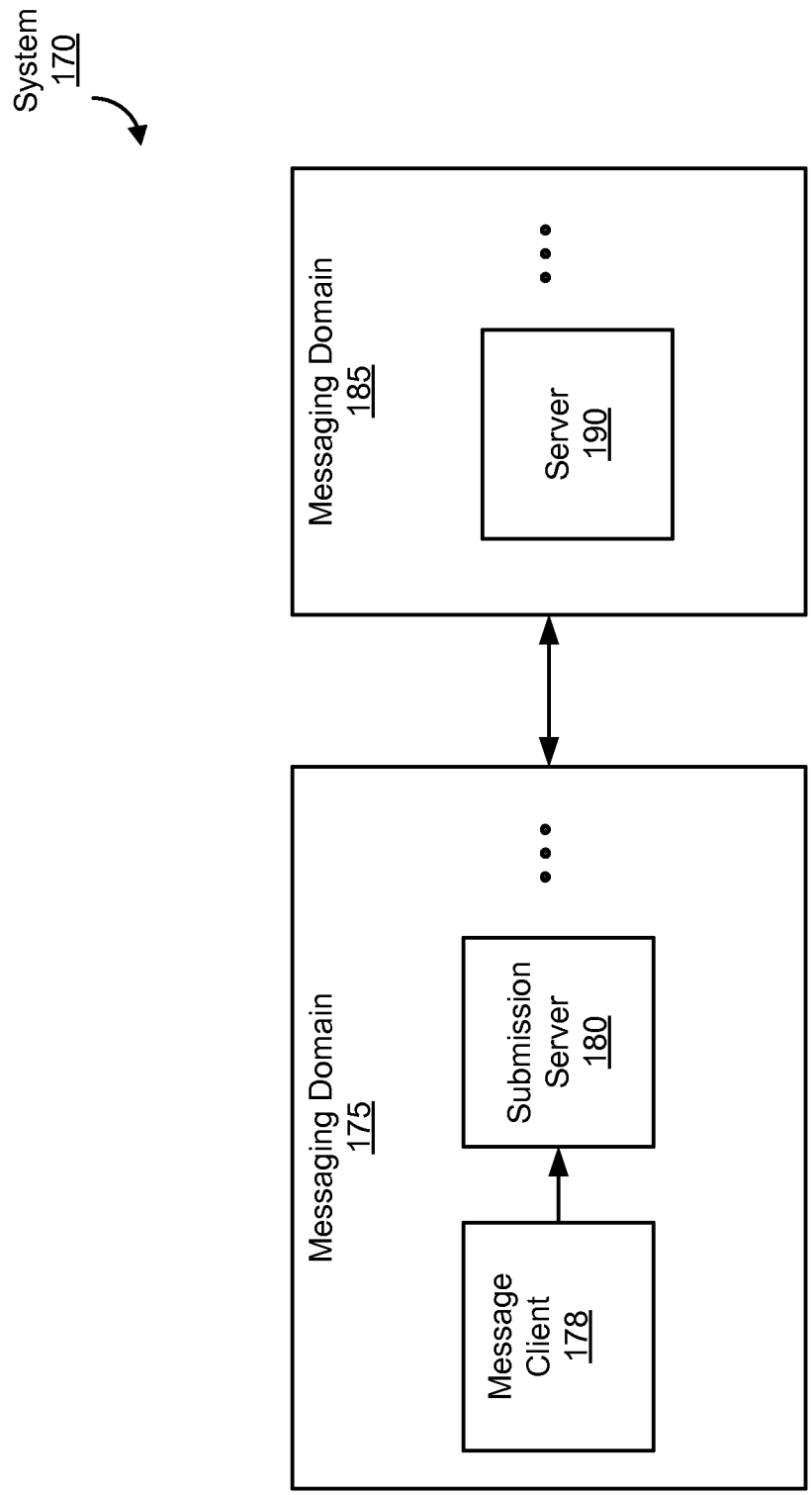
FIG. 1B is a simplified block diagram illustrating components of an example system in which the present disclosure can be implemented, according to one or more embodiments.

FIG. 1B illustrates an example system 170, in which the present disclosure can be implemented. System 170 illustrates multiple messaging domains, e.g., illustrated as messaging domain 175 and messaging domain 185, which may be needed to transport a message from a sender to a recipient. In some cases, a message that is created within a first messaging domain needs to be transported to a second messaging domain to arrive at a final destination. Such scenarios can occur, for example, when a sender and a recipient operate within different messaging domains. One or more message format transformations may be necessary when transporting messages from messaging domain 175 to messaging domain 185. Such functionality may be performed by one or more components in messaging domain 175 and/or messaging domain 185.

As shown, a message is created by a message client, e.g., illustrated as message client 178. The message is transmitted to a submission server, e.g., illustrated as submission server 180. Submission server handles, delays, and routes message, as needed, in a manner comparable to submission server 120 of FIG. 1A. Although not shown, a number of other components may reside within messaging domain 175, such as a message tracking server, a message queue, a message store, and the like. The original message is then transmitted to a second messaging domain, e.g., messaging domain 185. A server, such as server 190, receives the incoming message and performs any and all handling and routing operations needed to transmit the incoming message to the intended recipient. Although not shown, a number of other components may also form part of messaging domain 185, such as a message tracking server, a message queue, a message store, and the like.

In some cases, both messaging domains, e.g., messaging domain 175 and messaging domain 185, support recall functionality, which means that such messaging domains can receive recall commands (and associated parameters) and process the recall commands accordingly. In such cases, the recall of a message that has already been transmitted outside the original (e.g., local) domain may still be able to be recalled. The original recall command and accompanying parameters are transmitted from the first messaging domain to the second messaging domain for processing therein. A result of processing the recall operation at the second messaging domain is transmitted to the original domain.

In other cases, however, the second messaging domain, e.g., messaging domain 185, may not support recall functionality. If a message has already been transmitted to server 190 when a recall operation is requested, the recall operation will be unsuccessful. This is because messaging domain 185 and the components therein will be unable to identify and process the recall command.

As shown, system 170 includes two messaging domains when attempting to deliver a message from a sender to recipient. Nevertheless, system 170 may include more than two messaging domains, in varying configurations, with such messaging domains varying in recall capability.

Figure 2:
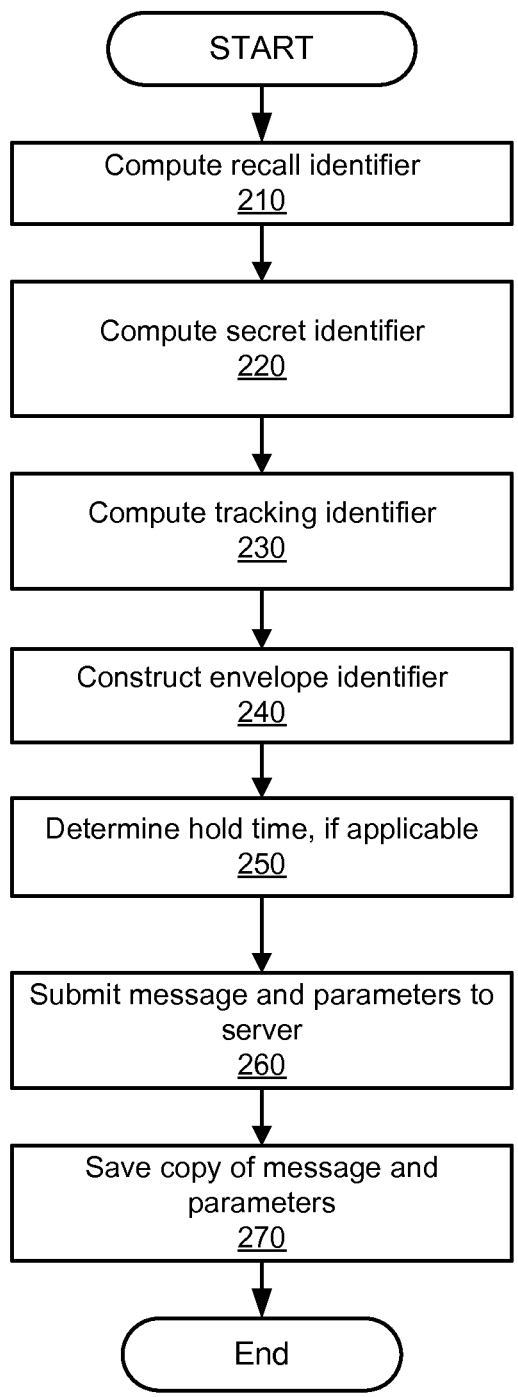
FIG. 2 is a flowchart illustrating an example process for submitting a message, as performed by a recall-capable client, according to one or more embodiments.

FIG. 2 is a flowchart illustrating an example process for submitting a message, as performed by a recall-capable client. The process of FIG. 2 is performed, for example, by a recall-capable message client, such as message client 110 of FIG. 1A.

The process begins at 210, where the message client computes a recall identifier, R, for each message, in order to enable the recall of such messages by an authorized user. The R parameter is, in certain embodiments, a random value generated for the user, but in any event, is a value that is effectively unique to the user. The R identifier is used to create additional identifiers/labels for a message that can ultimately be used to track the message, and if feasible, recall the message.

Once R has been computed, the process continues to 220. At 220, the secret identifier, S, is computed for the message. The S identifier can, for example, be generated by applying a cryptographic hash function to R. A cryptographic hash function employs an algorithm to encrypt and secure an input, such as R, such that the original R value cannot be recreated from the output value, S. An example of a cryptographic hash function is secure hash algorithm 1 (SHA-1).

The process continues to 230, where the message client computes a tracking identifier, T, for the message. In certain embodiments, such a tracking identifier, T, is computed by applying a second cryptographic hash function to S. By applying two hash functions to the original recall identifier, R, the message client thereby adds a second level of security to the message. Such identifiers can then be used, as needed, to track and recall a message. For example, to perform message tracking, only the S identifier need be used and exposed. Thus, if a track command is to be performed as a precursor to a recall command, the S identifier is used when requesting, verifying, and tracking the message. By contrast, the R identifier is used when requesting, verifying, and recalling a message.

At 240, the message client constructs an envelope identifier, E, for the message. The envelope identifier is a unique identifier that is created for each message. An envelope identifier serves to identify and distinguish the message from other messages. In particular, an envelope identifier can reflect information about the message regarding the sender, recipient, subject matter, and/or date of the message.

Next, at 250, a hold time, F, for the message is determined (if applicable). A hold time identifies a time period, if any, that the message is to be held by a submission server, prior to any further processing. In such cases, the message is received by a submission server (such as submission server 120 of FIG. 1A), and held at the submission server (which includes a message queue, such as message queue 130 of FIG. 1A) for a time period equivalent to the hold time, before the submission server transmits the message to any other components or recipients.

Assigning a hold time to a message is optional, and such a hold time, if implemented/used, will typically depend on a number of different considerations. For example, a hold time may not be applicable to messages that have been assigned a certain priority level (e.g., messages needing immediate attention). In other scenarios, a hold time may not be desired for certain senders and/or certain recipients. Even further, a hold time may vary depending on the type of recipient (e.g., local versus remote recipient), given the difficulty in recalling messages for a remote recipient. Thus, hold times to purposely delay the transmission of a message are not always used and/or recommended. However, the use of a hold time delay, if appropriate, is attractive given that the delay increases the likelihood of a successful recall.

Typically, a sender identifies a message to be recalled within a short amount of time after the original submission of the message. If a request for a recall of the message (which has been purposely delayed) is made relatively quickly, the message is likely to be held at the submission server when such a request is received. In such scenarios, the message has not been sent to the recipient (or any other components/domains) yet. As such, notifications regarding the message have not yet been generated or sent to the recipient, which allows for a successful recall to be performed. Alternatively, without using a delay, the message or notifications regarding the transmission of the message are likely to have been transmitted to the recipient and/or to other domains or components that may or may not support recall functionality, which can significantly reduce the likelihood of a successful recall. Thus, the use of a delay, as defined by F, when appropriate, should be used to increase the likelihood of a successful recall. An example hold time value that can be used is 5 minutes.

As shown, the computation of a recall identifier, secret identifier, tracking identifier, and envelope identifier is performed before the computation of a hold time. However, in alternative embodiments, the order of such computations can be changed. Hence, a hold time can be determined before or during the computation of a recall identifier, secret identifier, tracking identifier, and envelope identifier. In yet other embodiments, or simply as alternatives to the foregoing (such that the hold time may either be client-requested or calculated by the submission server, as noted), a (recall-capable) submission server can be configured to employ a set a hold time, regardless of whether the submitting user/user's client requested a hold time, the recall-capable server may choose to set a hold time. The submission server can be configured to provide such a capability (imposing a hold time itself) in order to, for example, support non-recall-capable clients. Further still, the submission server can be configured to compute a hold time, optionally performing such computation based upon characteristics of the submitting user, characteristics of the submitted message, time of day, or a variety of other parameters.

The process continues to 260. At 260, the message client submits the message, along with the T, E, and F parameters to a submission server. In addition, at 270, the message, as well as the R and E identifiers, are saved by the message client. If, and when, the sender wishes to request the recall of a message, the sender can retrieve the saved R and E identifiers and issue a recall command along with the R and E identifiers. At this point, the process of FIG. 2 ends.

In the event that a client wishes to request a track command (e.g., before performing a recall operation), the client would submit a track command, along with the S identifier. The S identifier could be recalculated using the R identifier saved at the client. Alternatively, the client can also retrieve a stored copy of the S identifier, if such an identifier was previously stored by the client.

Figure 3:
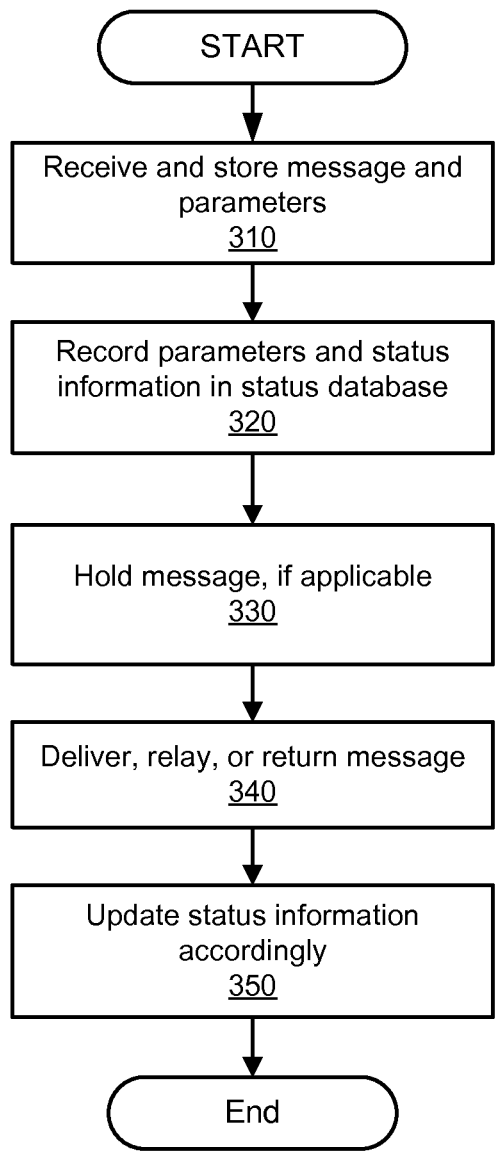
FIG. 3 is a flowchart illustrating an example process for handling a message, as performed by a server, according to one or more embodiments.

FIG. 3 illustrates a process for handling messages, as performed by a server. In particular, the process of FIG. 3 is performed by a submission server, such as submission server 120 of FIG. 1A, in cases where a message is being received from a recall-capable client.

The process begins at 310, where the submission server receives and stores a message and any associated parameters (including T, E, and F). At 320, parameters T and E are recorded as part of the status information for the message. As an example, T and E are recorded within a central database (e.g., a status information database) that may be used to identify messages and their location. Status information in the central database is typically created and updated as the message is received, delayed, relayed to other components or domains, returned, and so on. Status information is typically indexed according to the T and E parameters.

At 330, the received message is held (in a queue) for a time period equivalent to the hold time, if applicable. Such a delay is optional and only performed if the F parameter was received as part of 310. In some cases, no delay is desired or needed, and thus, step 330 is omitted. Once the message is delayed for the appropriate amount of time, the message is either delivered, relayed, or returned at 340. Optionally, the server, regardless of whether or not a hold request was included in the message submission, may impose some hold time itself, using its own criteria which may include characteristics of the submitting user, characteristics of the submitted message, as well as general policy.

A message can be delivered at 340, for example, if the intended recipient is within the same domain as the sender. Alternatively, if the recipient is part of another domain, the message is relayed to other components at 340. In cases where the sender has requested a recall of a message, the message can instead be returned at 340 (particularly if the message was delayed and is held in a queue by the submission server).

If and when the message is delivered, relayed, or returned, the status information for the message is updated accordingly at 350. Such updates can include a change in status, the new location of the message, and/or the inclusion of a corresponding timestamp for the message, among other information. At this point, the process of FIG. 3 ends.

Figure 4:
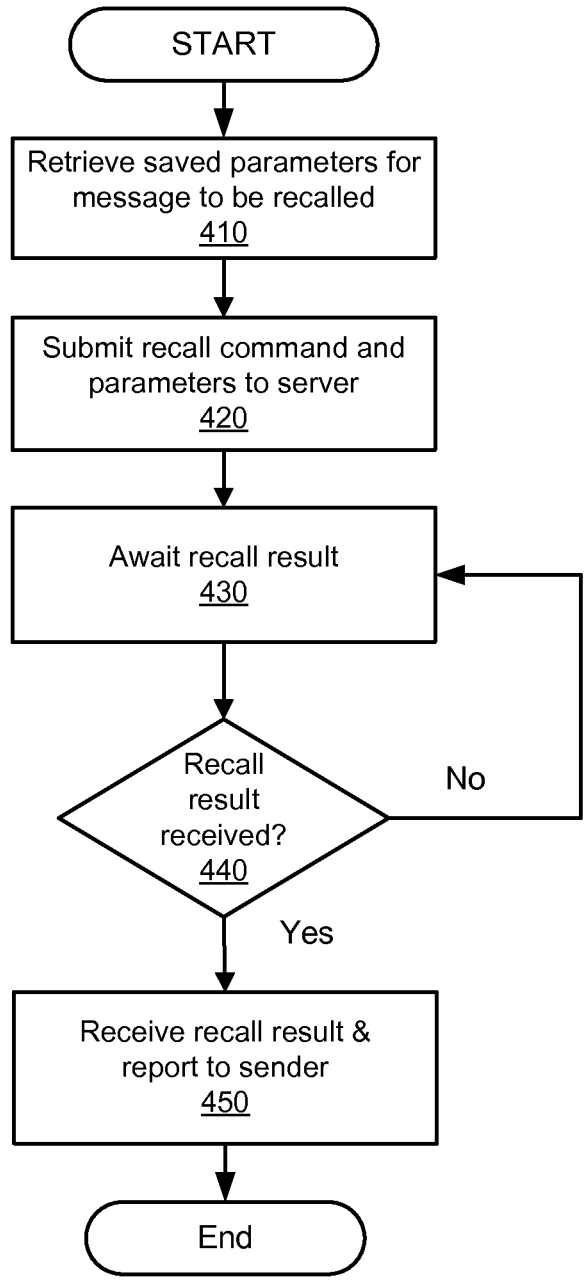
FIG. 4 is a flowchart illustrating an example process for requesting the recall of a message, as performed by a recall-capable client, according to one or more embodiments.

FIG. 4 illustrates a process for requesting a recall of a message, as performed by a recall-capable client. The process of FIG. 4 is performed after the initial submission of a message by the recall-capable client (as shown in FIG. 2), such that the recall-capable client has stored the necessary parameters to identify the sender and the message itself.

The process of FIG. 4 begins at 410, where the message client retrieves the saved R and E identifiers corresponding to the message to be recalled. Such identifiers would ideally have been stored by the message client when the message was originally submitted by the sender. Thereafter, at 420, the message client submits a recall command, along with the R and E identifiers, to the submission server to request a recall of the message. In the event that a message client wanted to submit a track command before a recall command (or instead of a recall command), the S identifier would be submitted along with the track command.

At 430, the message client awaits receipt of a recall result. A determination is made at 440 to determine whether a recall result has been received. If no recall result has been received, the process continues to 430, where the message client continues to await a recall result. Alternatively, if a result has been received, the process continues to 450. At 450, the message client receives the recall result and reports the result to the sender.

In some cases, the sender may initially request tracking information for the message as part of a track command (prior to processing a recall command) If such were the case, the sender would submit a track command, along with the S identifier. The tracking information, once received, would then be utilized to process the recall command. Based on the tracking information, the message client could decide to proceed with the recall command or abandon the recall command altogether (e.g., such as in cases where the recipient has already received the message or viewed any portion thereof or in cases where the message has already been relayed to a remote recipient that does not support recall functionality).

Once the recall result has been received and reported to the sender, the process ends. The process of FIG. 4 can be performed as shown, or alternatively, can be modified to allow for a track command and a subsequent recall command based on the contents of the status information received in response to the track command.

Figure 5:
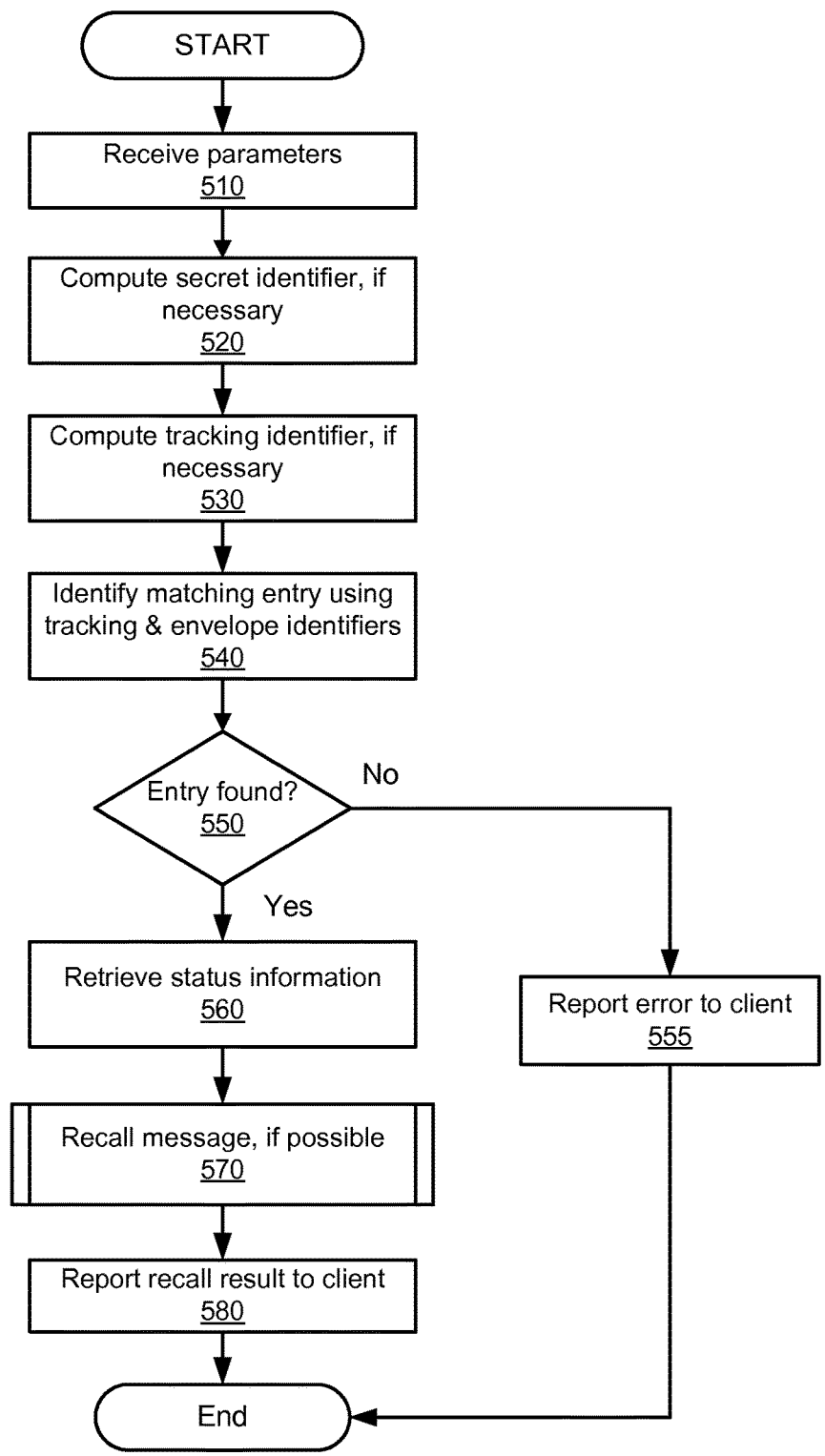
FIG. 5 is a flowchart illustrating an example process for processing a message recall request, as performed by a server in the case of a recall-capable client, according to one or more embodiments.

FIG. 5 illustrates an example process performed by a server when attempting to process a message recall request. The process of FIG. 5 is performed by a submission server, such as submission server 120 of FIG. 1A, in combination with a message tracking server, such as message tracking server 150 of FIG. 1A. The process FIG. 5 is performed in scenarios where a client submitting the recall request is recall-capable (e.g., can provide the security labels needed to process the recall request).

The process begins at 510, where the server receives the R and E identifiers from the recall-capable client. The R and E identifiers are unique to the sender and the message to be recalled, and thus, can be used to re-create additional identifiers that should match previous identifiers submitted by the sender. Upon receiving the R and E identifiers, the server continues to 520. At 520, the server computes a secret identifier, S, for the message, if necessary, by applying a hash function to the R identifier. The S identifier would be used in the event that a track command were received instead of a recall command.

Thereafter, the server computes a tracking identifier, T, for the message at 530, if necessary, using the S identifier. In particular, T is computed by applying a second hash function to S. Once the T identifier has been calculated, status information for the message (e.g., status information within an entry in a status information database, as indexed by the T and E identifiers) is searched for at 540. Status information can include, for example, information regarding a location of a message, previous and future processing of the message, transmission/relay information for the message, information regarding whether the message has been transmitted to the recipient, information regarding whether the message has been accessed by the recipient, information regarding whether a notification regarding the message has been sent to the recipient, information regarding the last access time for a folder comprising the message, information regarding the priority level of the message, and so on.

A determination is made at 550 to determine whether an entry could be thus identified (e.g., whether a matching entry was found by the server). If no matching entry is found (e.g., the sender and message combination have not been previously processed), the process continues to 555. At 555, an error message or notification is generated and reported to the message client. A matching entry may not exist for a number of different reasons. In some cases, the sender is not the person requesting the recall of the message, and thus, the T parameter will not match the previously recorded T parameter. In other cases, the message may not have been received by the submission server due to network issues or the like, and thus, no status information entry may have ever been created for the message identified by the T parameter.

Alternatively, if a matching entry is found, the process continues to 560. At 560, the status information is retrieved or accessed by the server. The server then attempts to recall the message, if possible, at 570, using the status information retrieved at 560 (and the R identifier, if necessary, such as when the message has been moved to a non-local but recall-capable domain). Details regarding the recall process can be seen with further regard to FIG. 6A and FIG. 6B. In some cases, a recall request may result in a successful recall. In other cases, however, a message may not be recalled if any portion of the message has been viewed by the recipient, or if the message has been transferred to another domain that does not support recall services. At 580, the result of the recall process is reported to the message client. At this point, the process of FIG. 5 ends.

The process of FIG. 5 may be modified according to the specific type(s) of request submitted by the user. For example, a message client may request status information as a first command (e.g., via a track command that uses the S identifier) and subsequently request the recall of the corresponding message (e.g., via a recall command that uses the R identifier), if the status information indicates a successful recall is possible. In such cases, the functionality of FIG. 5 may be modified to report the identified status information to the message client, await recall instructions, and subsequently attempt to perform the recall process, if desired. As will be further appreciated, such operations can be combined into a single operation (e.g., recall if tracking indicates message can be recalled), or the like.

Figure 6A:
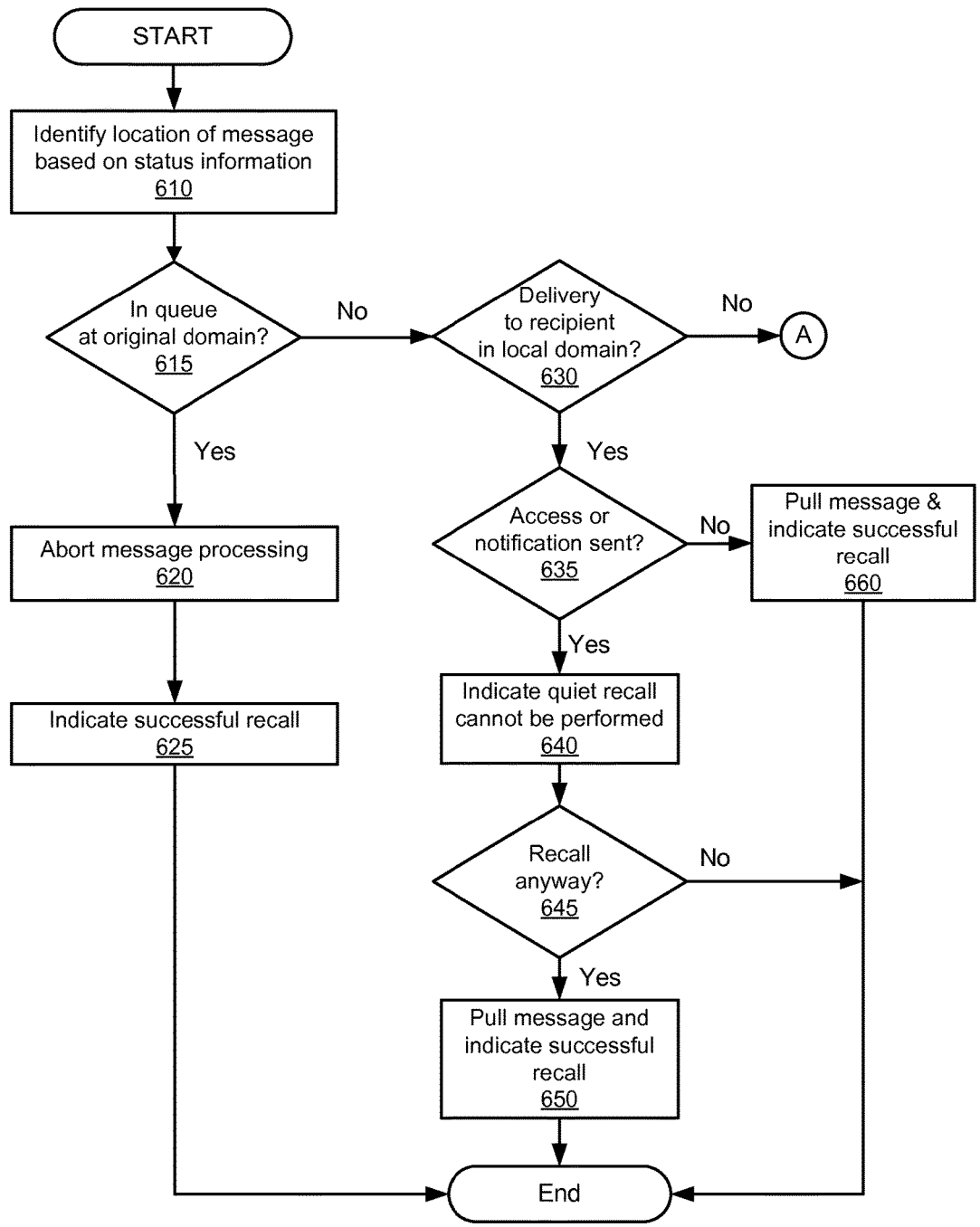
FIG. 6A is a flowchart illustrating an example process for determining whether a message recall can be performed, according to one or more embodiments.
Figure 6B:
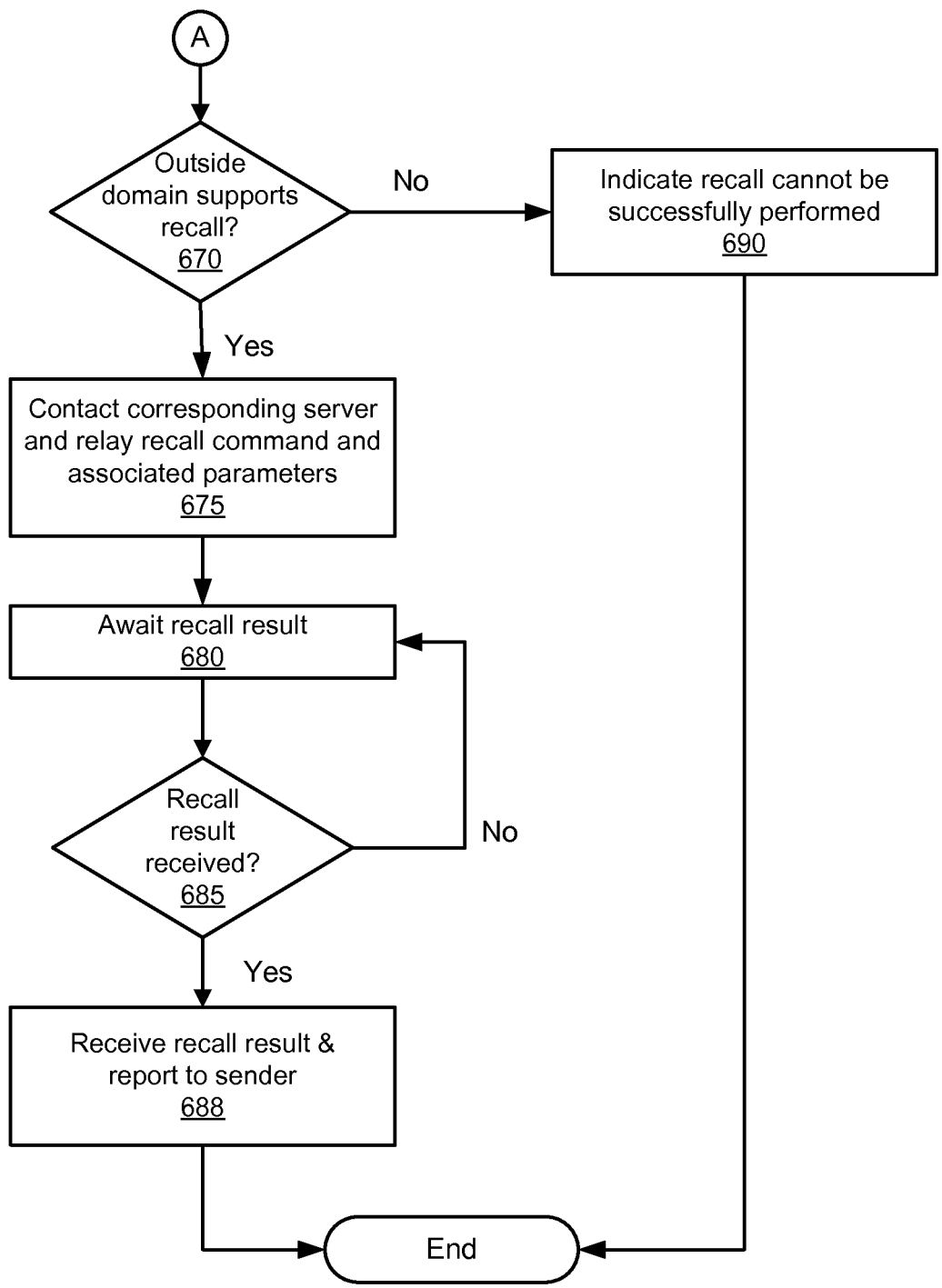
FIG. 6B is a flowchart illustrating an example process for determining whether a message recall can be performed, according to one or more embodiments.

FIG. 6A and FIG. 6B illustrate a process for determining whether a message recall can be performed. Such functionality illustrates the analysis performed in element 570 of FIG. 5. The combined functionality of FIG. 6A and FIG. 6B can be performed by a submission server, in combination with a message tracking server. The process of FIG. 6A and FIG. 6B can be performed in response to receiving a recall command (that uses an R identifier), as received from a message client.

The process of FIG. 6A begins at 610, where the location of the message to be recalled is identified. Such a location can be determined, for example, using tracking information for the message (which is obtained using the T and E identifiers of a message, as shown in element 560 of FIG. 5). Tracking information for a message can be retrieved as a result of performing a track command (that uses an S identifier). The process continues to 615, where a determination is made as to whether the message to be recalled is located in a queue within the local (e.g., original) domain. If the message is located within a queue at the local domain, the process continues to 620. At 620, processing of the message is aborted. Such functionality essentially cancels the transmission of the message to any further components, domains, and/or the recipient, deletes information associated with the message in the queue, and performs any other operations, as may be necessary. Thereafter, at 625, an indication of a successful recall is made. At this point, the recall process ends.

Alternatively, if a determination is made at 615 that the message to be recalled is not located in a queue at the original domain, the process continues to 630. At 630, a further determination is made as to whether the message to be recalled has been delivered to the recipient in the local domain. If the message has been delivered to the recipient in the local domain, the process continues to 635. A further determination is made at 635 to determine whether the message to be recalled (or any portion thereof, such as metadata regarding the subject and/or identity of the sender) has been accessed by the recipient or whether any notification regarding the message has been sent to the recipient.

If the message has been accessed or a notification regarding the message has been sent to the recipient, the process continues to 640, where an indication is made that a quiet recall cannot be performed. A quiet recall, as desired herein, constitutes the recall of a message, where the recipient has not received any information regarding the existence or transmission of such a message.

The process continues to 645, where a determination is made as to whether the recall of the message should be performed, despite the fact that a quiet recall cannot be performed. A recall of a message that has already been accessed, or for which a notification has already been sent, may nevertheless be desirable for administrative purposes. For example, in cases where a message includes spam or malware, the recall of a message (whether quiet or not) may be deemed necessary to prevent the transmission and/or execution of the spam or malware by the recipient. If the recall operation is to be performed, the process continues to 650. At 650, the message is recalled (e.g., pulled from the recipient's account). Pulling a message may include operations such as deleting the message from the recipient's account, deleting information regarding the message, and so on. In addition, an indication is made that the recall of the message was successful. Otherwise, if a determination is made that the recall operation is not to be performed, the process ends.

Returning to 635, if a determination is made that the message has not been accessed and a notification regarding the message has not been sent to the recipient, the recall operation is performed. At 660, the message to be recalled is pulled from its existing location and a successful recall indication is generated. The process then ends.

Returning to 630, if a determination is made that the message has not been delivered to the recipient in the local domain, the analysis continues to 670, which is part of FIG. 6B. At 670, a determination is made as to whether the non-local (e.g., outside) domain supports recall functionality. An outside domain is considered to support recall services, if the outside domain can receive and process a recall command and accompanying parameters.

If the outside domain supports recall functionality, the process continues to 675, where the recall command and accompanying parameters (such as the R identifier for a recall command versus an S identifier for a track command) are forwarded to a corresponding server at the outside domain. The operations performed in 675 by the corresponding server at the outside domain are similar to those performed in FIGS. 6A and 6B. Thereafter, the server will await a recall result at 680. A determination is made at 685 to determine whether a recall result has been received. If no recall result has been received, the process continues to 680, where the message client continues to await a recall result. If a recall result has been received, the process continues to 688. At 688, the message client receives the recall result and reports the result to the sender. Alternatively, if a determination is made at 670 that the outside domain does not support recall functionality, the process continues to 690. At 690, an indication is made that the recall command cannot be successfully performed. At this point, the process of FIG. 6A and FIG. 6B ends.

Figure 7:
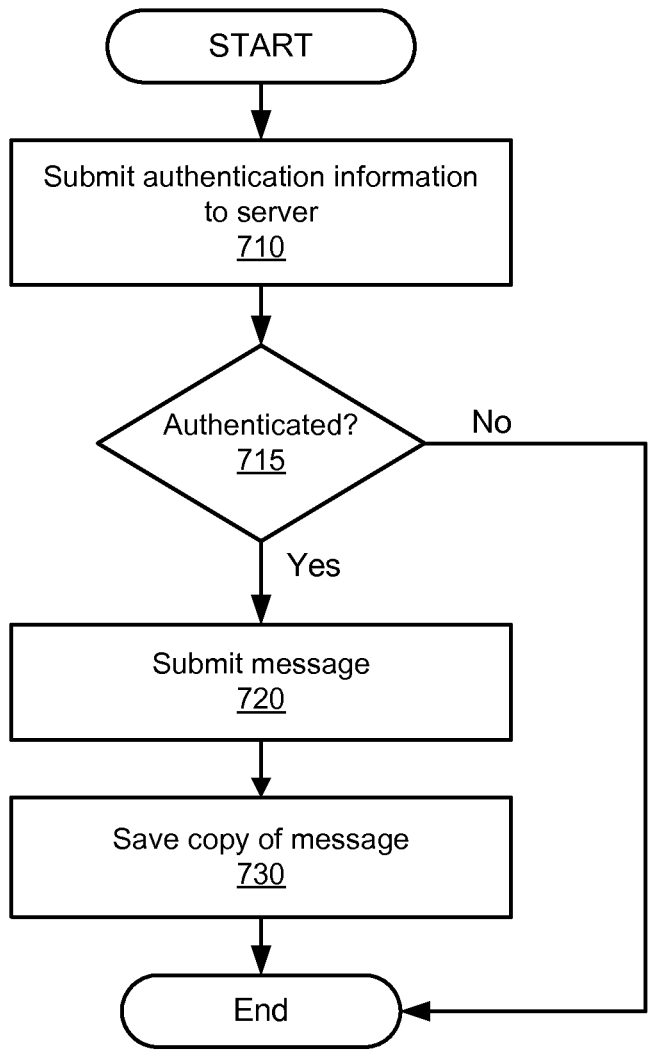
FIG. 7 is a flowchart illustrating an example process for submitting a message, as performed by an unextended client, according to one or more embodiments.

FIG. 7 illustrates a process for submitting messages, as performed by an unextended client. An unextended client is a message client (e.g., such as message client 110 of FIG. 1A) that is not capable of generating the security identifiers needed to perform a message recall. In such cases, a submission server (e.g., such as submission server 120 of FIG. 1A) generates the security identifiers needed to enable the recall of messages generated by the unextended client, using authentication information provided by the unextended client.

The process of FIG. 7 begins at 710, where the unextended client submits authentication information to the submission server. Authentication information is information submitted by a user via an unextended client to verify the user. Authentication information can include, for example, a user name and password corresponding to the user. Additional authentication information can include a domain name, date, and so on.

Thereafter, a determination is made at 715 to determine whether the user of the unextended client has been authenticated. If the user of the unextended client has not been authenticated, the process ends. Alternatively, if the user of the unextended client has been authenticated, the process continues to 720.

At 720, the user submits a message to the submission server, via the unextended client. The message submission can include, for example, submitting the message metadata, text, attachments, and so on. At 730, the unextended client saves a copy of the message. As will be appreciated in light of the present disclosure, clients can save, or can be configured to save, their own copy of a sent message, such as in a "Sent" folder. Thus, methods and systems such as those described herein can make use of a normal operation of unextended clients—the simple saving by the client of a copy of a sent message—as a source for certain information used to enable later recall of messages. The copy of the message may include information such as a message identifier, M, and a date, D for the message. At this point, the process of FIG. 7 ends.

Figure 8A:
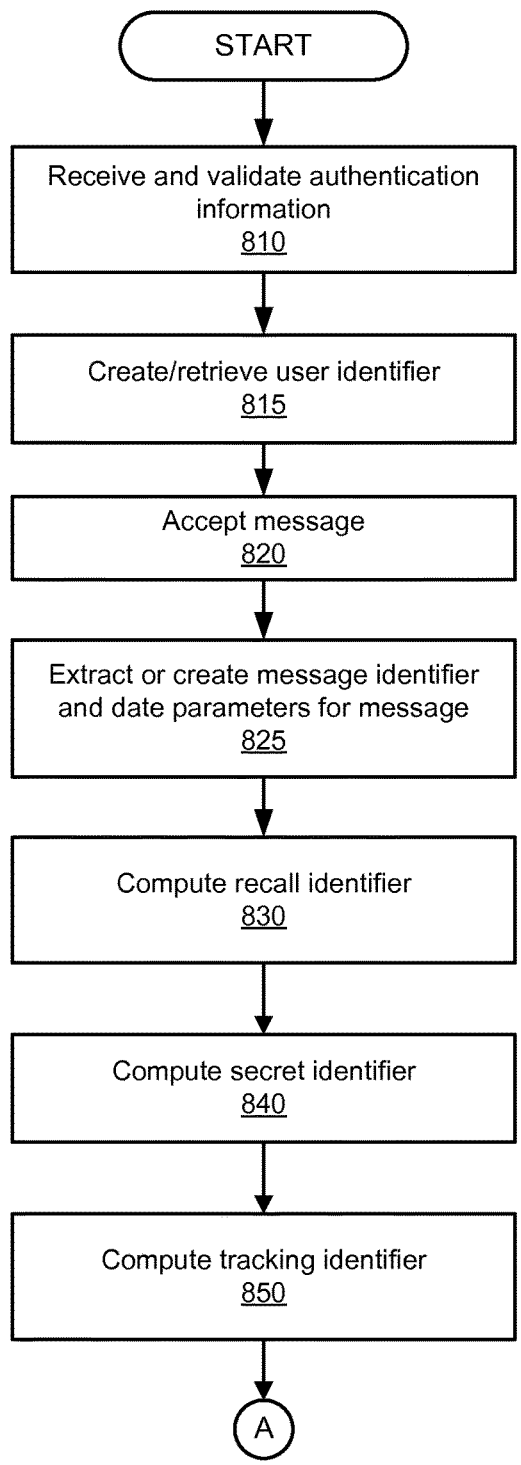
FIG. 8A is a flowchart illustrating an example process for handling a message, as performed by a server in cases of an unextended client, according to one or more embodiments.
Figure 8B:
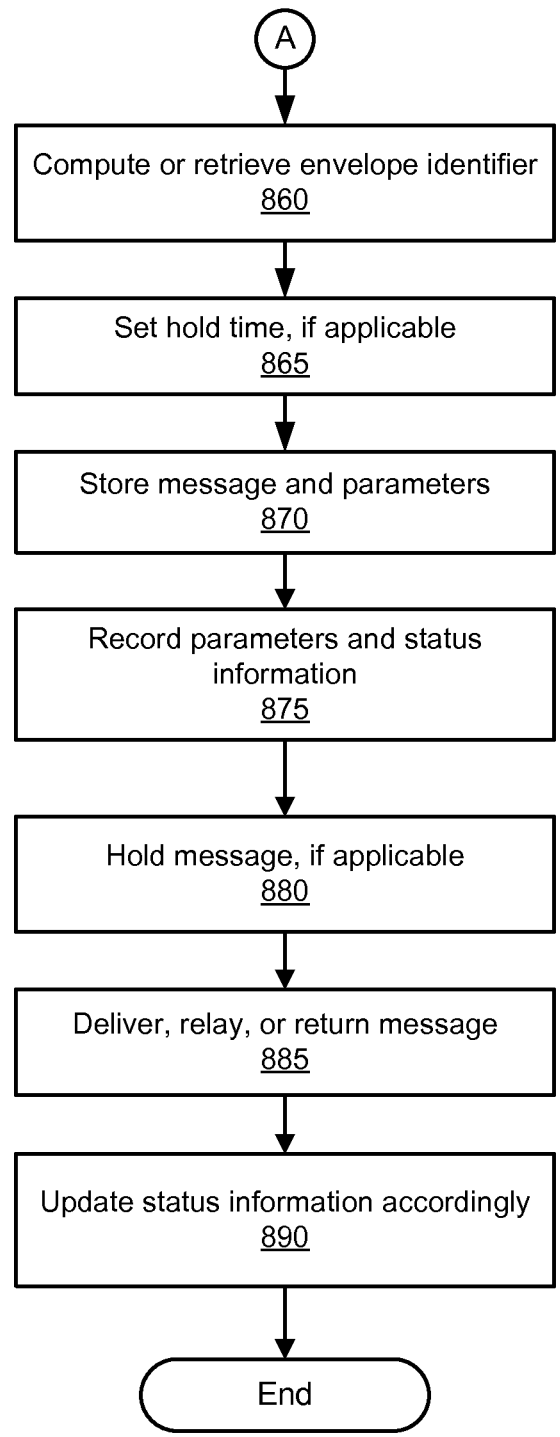
FIG. 8B is a flowchart illustrating an example process for handling a message, as performed by a server in cases of an unextended client, according to one or more embodiments.

FIG. 8A and FIG. 8B illustrate a process for handling messages, as performed by a submission server (such as submission server 120 of FIG. 1A). The processes of FIGS. 8A and 8B are performed in the event that a submission server communicates with an unextended client (e.g., a client that is unable to generate and transmit security identifiers necessary to identify a message and/or the authenticity of the sender for recall purposes). By performing the processes of FIG. 8A and FIG. 8B, the submission server is able to generate applicable security identifiers for a message and a sender, and thereby enable future recall functionality by the sender.

The process begins at 810, where the submission server receives and validates authentication information for a user (e.g., as received from an unextended client). For example, a user name and password may be identified and compared with stored data to verify the user's identity. Once the user has been verified, the submission server will create or retrieve a user identifier, U, for the user at 815. The first time the user authenticates to the submission server, the submission server will create U (e.g., an identifier that is unique and specific to the user). Once created, the U parameter is stored at the submission server as part of the user's account information. Whenever the user authenticates to the submission server at later times, the submission server will retrieve U, as necessary.

A message sent by the user, is then accepted at 820. Thereafter, the submission server will retrieve the U parameter (from the user's account information) and extract several properties related to the received message at 825. The message properties include, for example, a message identifier, M, and a date, D, pertaining to the message. In one embodiment, the M and D parameters are properties that are created and/or extracted from the message header and/or message content (e.g., using information such as the sender, recipient, subject, type, and/or size).

Using the parameters identified at 815 and 825, a recall identifier, R, is computed at 830. First, the M, D, and U parameters are concatenated (e.g., linked together, in the order listed, to create a single value). The R parameter is then computed by applying a hash function to the concatenated result of M, D, and U. The result of the hash function is equated to R. Thereafter, a secret identifier, S, is computed at 840. The S value is computed by applying a second hash function to R. A tracking identifier, T, is then computed at 850 by applying a third hash function to S.

The process continues to 860 of FIG. 8B. At 860, the submission server computes or retrieves an envelope identifier, E, for the message. In some embodiments, the unextended client attaches an envelope identifier, E, to the message. In such cases, E is simply retrieved by the submission server at 860. In other embodiments, however, the E parameter is not provided by the unextended client. In such cases, the submission server will create E at 860. In order to create E, the submission server extracts an email address for the user and a domain, N, associated with the user's account. A hash function is also applied to the tracking identifier, T. The E parameter is then computed by concatenating the hash result of T, the email address for the user, and N.

At 865, the submission server identifies and automatically sets a hold time, F, for the message, if applicable. A hold time, F, is typically set based on information retrieved from the user's account. For example, the submission server may consider information such as the sender, the recipient, the priority assigned to the message, and so on. In some cases, no F parameters are assigned based on the urgency of the message or the type of sender or recipient.

The process then continues to 870, where the submission server stores the message, along with parameters T, E, and F. At 875, parameters T and E are also recorded within status information that is maintained in a central database, such as a status information database. Further, it will be appreciated that, in light of the present disclosure, while the "F" hold time is not typically stored in such a status information database (F typically being held elsewhere, such as being stored along with the message itself, in a message queue), F can be stored in a central database (e.g., status information database), such as that described herein. The parameter F, if applicable, is applied to the message at 880. At 885, the message is delivered, relayed, or returned accordingly. In response thereto, the status information maintained for the message is updated, as shown in 890. At this point, the process of FIGS. 8A and 8B ends.

Figure 9:
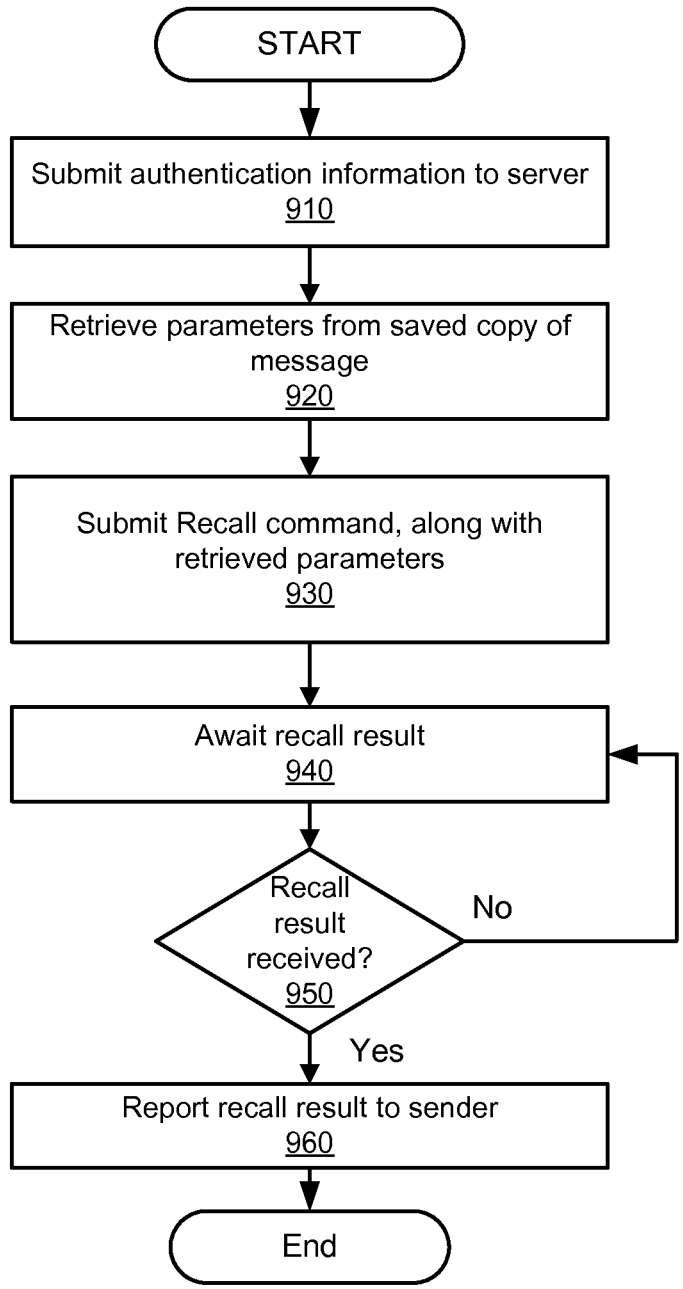
FIG. 9 is a flowchart illustrating an example process for requesting a message recall, in cases where the message was submitted by an unextended client, according to one or more embodiments.

FIG. 9 illustrates an example process for requesting the recall of a message, in cases where the message was originally submitted by an unextended client. The process of FIG. 9 begins at 910, where the unextended client submits authentication information to a submission server. Authentication information may include, for example, a log in name, password, and/or domain name. At 920, the unextended client retrieves parameters for the message to be recalled. These parameters include M and D, both of which can be retrieved from the copy of the message that was saved by the unextended client (e.g., 730 of FIG. 7). A request for a recall of a message is then submitted to a submission server at 930, along with the M and D parameters.

At this point, the recall command is processed. The unextended client awaits a result of the recall request at 940. At 950, a determination is made as to whether a recall result has been received. If no recall result has been received, the process continues to 940, where the unextended client continues to await a recall result. Alternatively, if a recall result has been received, the process continues to 960. At 960, the unextended client reports the recall result to the user. At this point, the process of FIG. 9 ends.

Figure 10A:
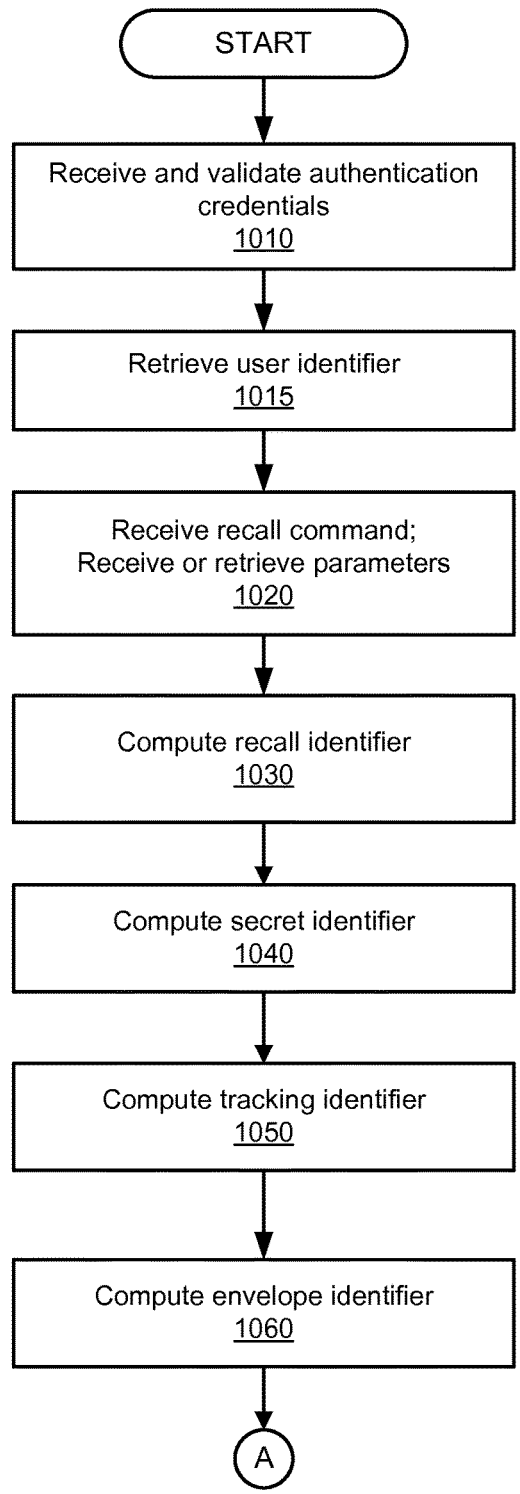
FIG. 10A is a flowchart illustrating an example process for processing a message recall request, as performed by a server in cases of an unextended client, according to one or more embodiments.
Figure 10B:
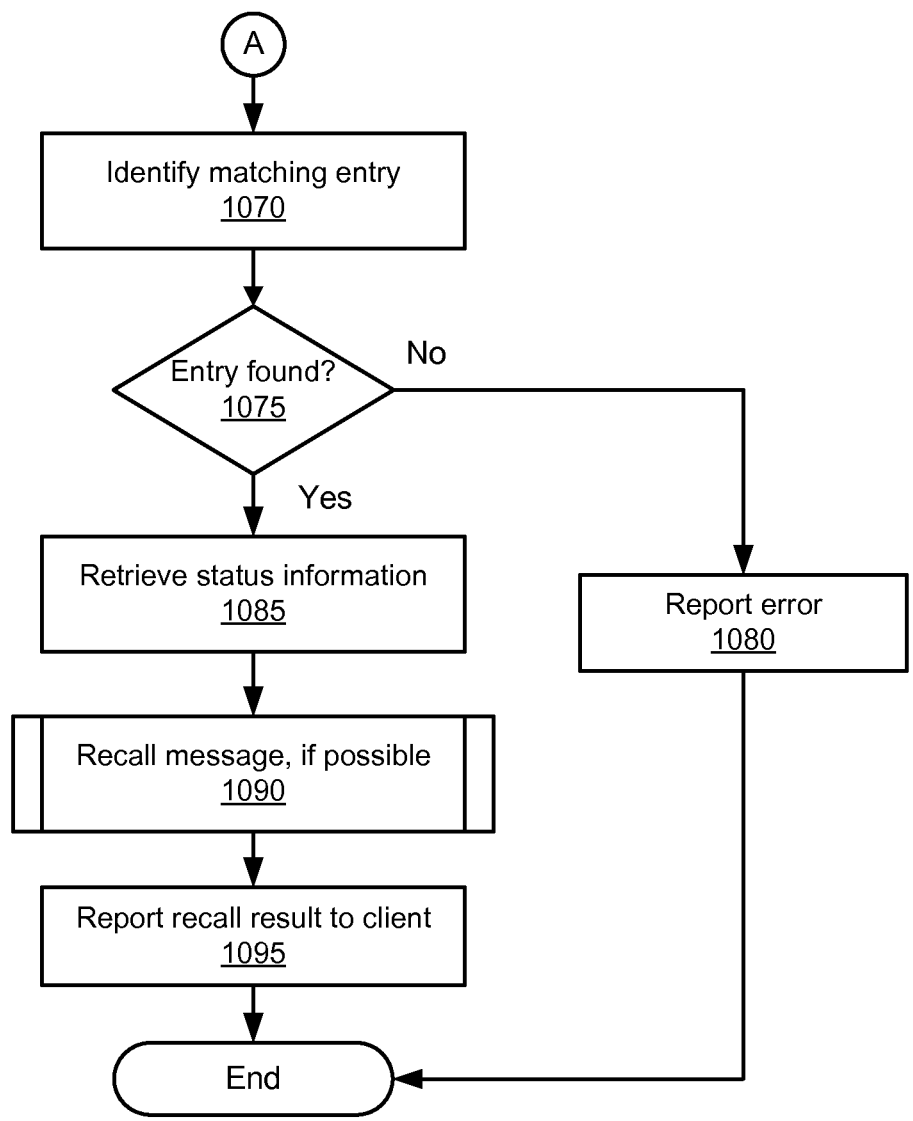
FIG. 10B is a flowchart illustrating an example process for processing a message recall request, as performed by a server in cases of an unextended client, according to one or more embodiments.

FIG. 10A and FIG. 10B illustrate an example process for attempting to recall a message. The processes of FIGS. 10A and 10B are performed by a submission server (e.g., such as submission server 120 of FIG. 1A) and/or a tracking server (e.g., such as message tracking server 150 of FIG. 1A). In addition, the processes illustrated in FIG. 10A and FIG. 10B are performed in response to receiving a recall request from an unextended client.

The process begins at 1010, where the server receives and validates authentication credentials for a user, as received from an unextended client. Once such credentials have been validated, the process continues to 1015, where the user identifier, U, (which is specific to the user and saved as part of the user's account information) is retrieved. At 1020, the recall command is received by the server. The M and/or D parameters may also be received at 1020, if such parameters are available to the unextended client and then provided to the server. In cases where the M and/or D parameters are not available to the unextended client, the server will retrieve the missing M and/or D parameters from storage as part of 1020.

Thereafter, the security identifiers needed to recall the message are computed at 1030-1060. At 1030, the recall identifier, R, is computed. First, the M, D, and U parameters are concatenated. A hash function is then applied to the concatenated result of M, D, and U to obtain R. Thereafter, the secret identifier, S, is computed by applying a second hash function to R at 1040. A third hash function is then applied to R to compute the tracking identifier, T, at 1050. An envelope identifier, E, for the message is then computed at 1060 by applying a hash function to T and concatenating the hash result of T, the email address for the user, and the domain, D, for the user's account.

The process continues to FIG. 10B. At 1070, an entry indexed by the T and E parameters is searched for within, for example, a central database (e.g., such as status information database of FIG. 1A). Such an entry is created and maintained for the message and includes status information describing the location and type of processing that has been performed on the message. A determination is made at 1075 to determine whether a matching entry indexed by the T and E parameters has been found. If no matching entry is found, the process continues to 1080, where the server reports an error to the message client indicating that the message cannot be properly recalled. The error reported in 1080 may include specific information regarding the type of error encountered.

Alternatively, if a matching entry indexed by the T and E identifiers is found, the process continues to 1085. At 1085, the status information contained within the matching entry is retrieved. Using this status information, an attempt to recall the message is made using the R identifier (e.g., such as by performing the process of FIG. 6A and FIG. 6B). Alternatively, an initial track command can be performed using the S identifier prior to deciding whether to proceed with the recall operation that uses the R identifier. A recall result is then received and reported to the client at 1095. At this point, the process of FIG. 10A and FIG. 10B ends. The process of FIGS. 10A and 10B can be modified or rearranged such that the process allows a client to request status information first (e.g., such as by issuing a track command) and then receives a follow-up request to recall, if desired, based on the received status information.

Figure 11:
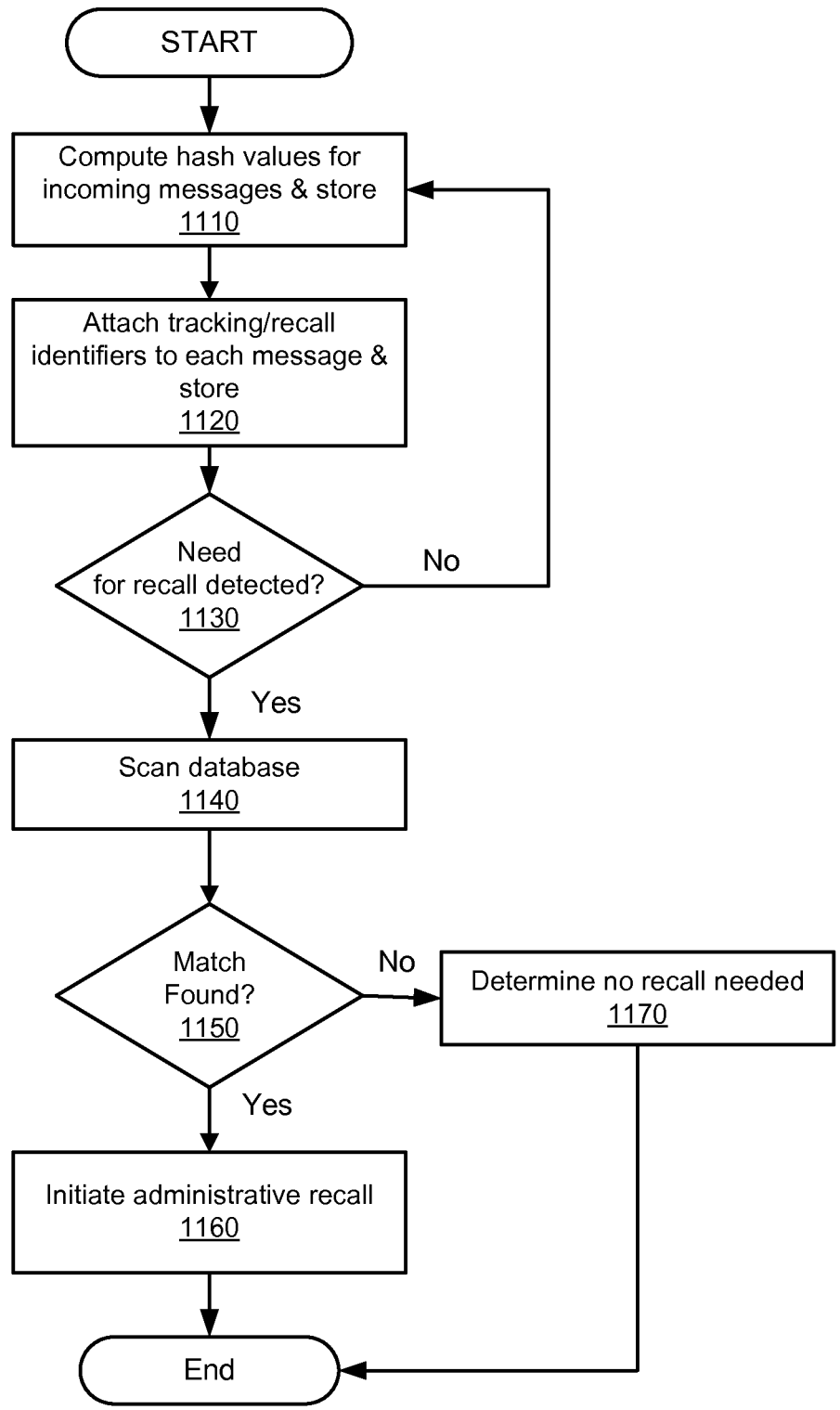
FIG. 11 is a flowchart illustrating an example process for performing an administrative recall, according to one or more embodiments.

FIG. 11 illustrates an example process for performing an administrative recall. An administrative recall can be performed to control the spread of spam and/or malware. In the time it may take to classify a new outbreak as spam or malware, one or more messages containing spam or malware may have been processed and/or delivered. An administrative recall process can be performed to automate the handling of messages that have been classified as spam or malware. In some cases, other reasons may exist for performing an administrative recall.

Typically, an administrative recall is performed by a system administrator. As such, various policies are defined to minimize the amount of information needed to allow the recall of messages by the administrator. In cases where an individual sender seeks to recall a message, several identifiers are needed and used to verify the identity of the user and the message to be recalled. By contrast, during an administrative recall, many of the same identifiers need not be provided by the system administrator to recall a message.

The process of FIG. 11 illustrates an administrative recall process, as performed by a message client (e.g., and more particularly an anti-spam/anti-virus engine) and/or a submission server. The process begins at 1110. At 1110, the anti-spam/anti-virus engine computes a hash value for incoming messages and stores the messages and the result of the hash function in a database. At 1120, tracking and recall identifiers are attached to each message and stored (along with the message and hash result of the message). The tracking and recall identifiers (which are computed as part of submitting and handling each message at the client and/or submission server) are attached by the anti-spam/anti-virus engine or the submission server.

At 1130, a determination is made as to whether a need for performing an administrative recall has been detected. As an example, the detection of a new outbreak (e.g., of spam or malware) may trigger the need for performing an administrative recall. If an administrative recall is not needed, the process continues to 1110 to continue processing incoming messages. Alternatively, if an administrative recall is deemed necessary and/or desirable, the process continues to 1140.

At 1140, the anti-spam/anti-virus engine scans the database containing the messages, the hashes of the messages, tracking identifiers, and recall identifiers. A determination is made at 1150 to determine whether a match exists. If a match is found, an administrative recall is initiated, as shown in 1160. The administrative recall is performed using the recall and tracking identifiers identified in the database. The system administrator need not provide any further identifiers to perform the administrative recall. The recall of malicious messages is performed in a manner similar to that described in FIG. 5 (specifically following steps 540-580). Alternatively, if no match is found at 1150, a determination is made that no administrative recall of messages is needed at 1170. At this point, the process of FIG. 11 ends.

An administrative recall also differs in a number of other ways from a user recall. For example, a non-delivery notification is not typically generated for the recall of spam or viruses, since doing so helps propagate further malicious messages. If a notification has to be generated for administrative reasons, the notification should not include any message content. Additionally, depending on administrative policies, an administrative recall may be performed even if a recipient has seen the message or been notified of the message. This is because once an outbreak has been detected, the recall of the message is needed to prevent further threat and/or transmission to others. Thus, once a message has been identified as part of an outbreak, the message should be quarantined and/or deleted, without the message being sent to the sender. Additional policies may also be employed to allow the system administrator to view the full path of a message using only a tracking identifier.

An Example Computing and Network Environment

As shown above, the present invention can be implemented using a variety of computer systems and networks. An example of one such computing and network environment is described below with reference to FIGS. 12 and 13.

Figure 12:
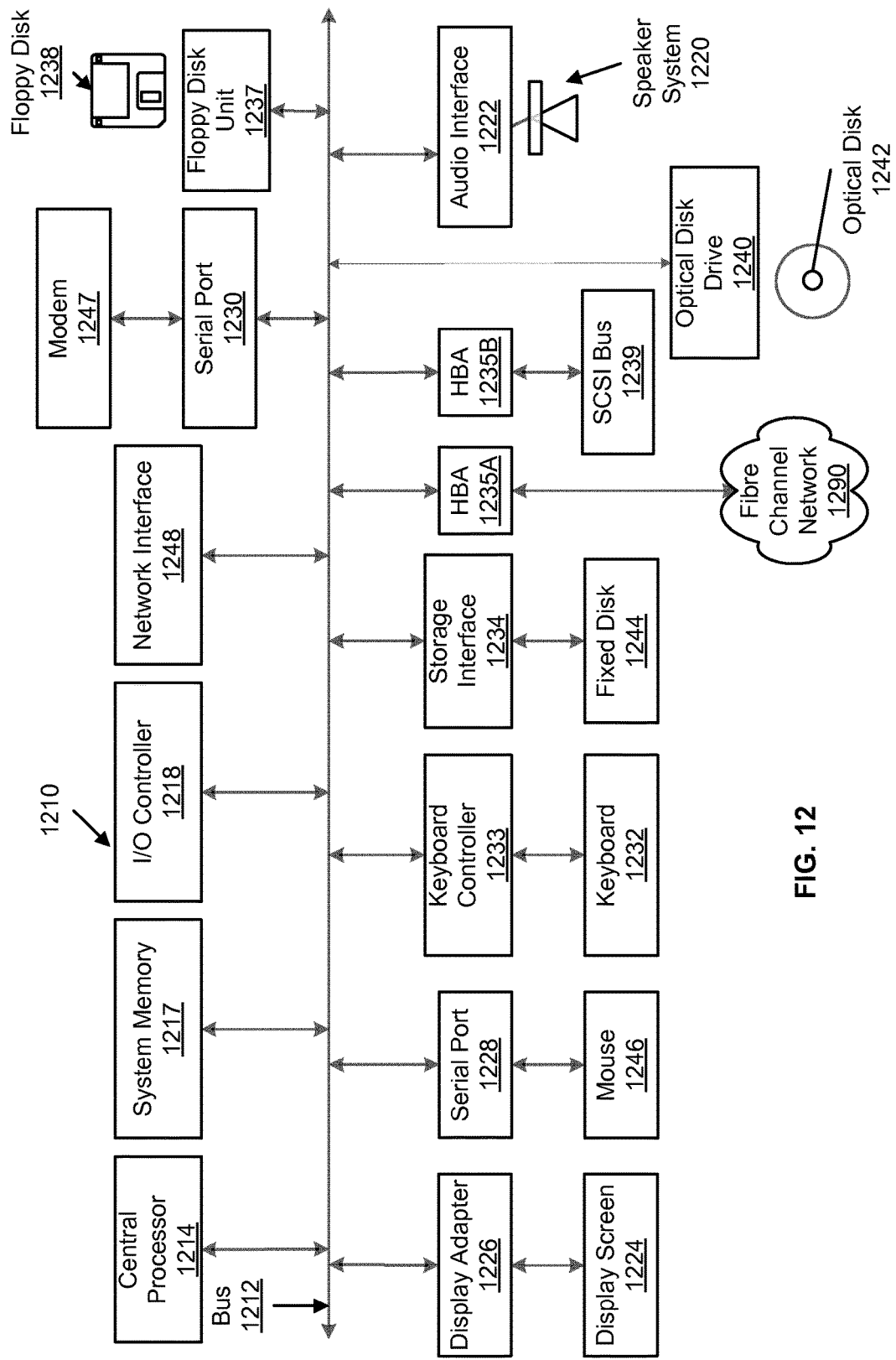
FIG. 12 is a simplified block diagram of an example computer system for implementing aspects of the present disclosure, according to one embodiment.

FIG. 12 depicts a block diagram of a computer system 1210 suitable for implementing aspects of the present invention Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio interface 1222, an external device, such as a display screen 1224 via display adapter 1226, serial ports 1228 and 1230, a keyboard 1232 (interfaced with a keyboard controller 1233), a storage interface 1234, a floppy disk unit 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 944), an optical drive (e.g., optical drive 1240), a floppy disk unit 1237, or other storage medium. Additionally, applications can be in the form of electronic signals modulated in accordance with the application and data communication technology when accessed via modem 1247 or network interface 1248.

Storage interface 1234, as with the other storage interfaces of computer system 1210, can connect to a standard computer-readable medium for storage and/or retrieval of information, such as a fixed disk 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
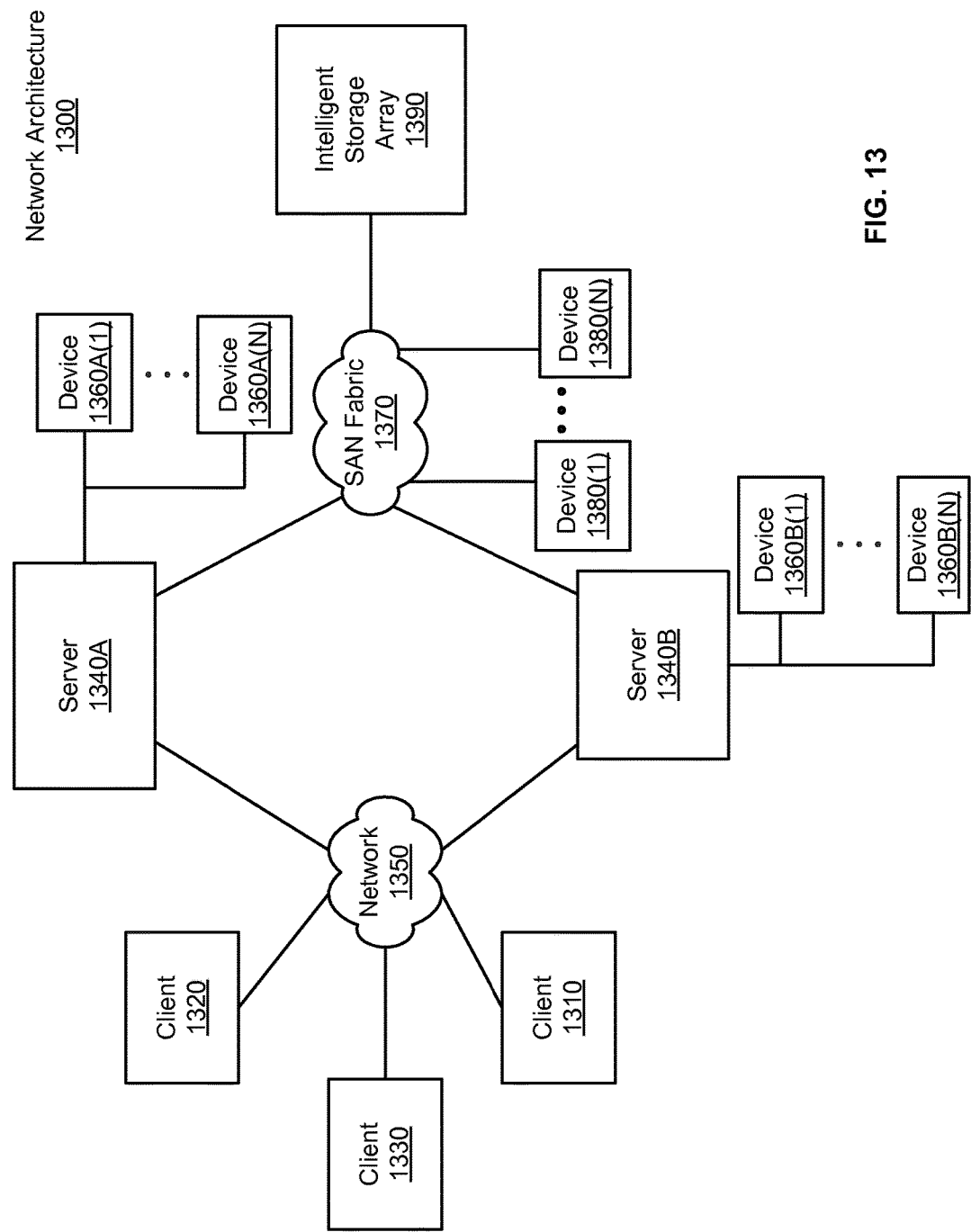
FIG. 13 is a simplified block diagram of an example network architecture for implementing aspects of the present disclosure, according to one embodiment.

FIG. 13 is a block diagram depicting a network architecture 1300 in which client systems 1310, 1320 and 1330, as well as storage servers 1340A and 1340B (any of which can be implemented using computer system 1310), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

For example, methods and systems such as those described herein can be considered as a minimum security version. Such methods and systems, as noted elsewhere herein, can be modified in a number of different ways. For example, such methods and systems can be configured with additional levels of encryption, if desired, to further restrict attempts to "hijack" the tracking or recall of a message. For instance, approaches such as those described herein can be modified to use an S/KEY approach, in which the "T" identifier on messages uses a concatenated list of one-time-use successively encrypted identifiers (generated by hashing S, then hashing that hash result, etc.), rather than using a single hash of "S". In such a configuration, any tracking or recall operation ("S" or "R" use, respectively) "uses up" one from the "T" list of identifiers, thereby eliminating the potential for reuse of "S" and "R" values emitted in tracking or recall operations, respectively. Further, it will be appreciated that the approach described for computing "S" and "T" is not intended to limit hashing or encryption of the identifier/tracking/recall secrets to only such basic levels of security.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   at a server separate from an email message client and an email recipient:
      receiving the first transmission of the email message, wherein the email message is created by the email message client, the email message is configured to be sent to the email recipient, wherein the email message client generates a recall identifier R for recalling the email message, computes, from the recall identifier R, a secret identifier S and a tracking identifier T for enabling tracking of the email message, and includes, in the first transmission of the email message, the tracking identifier T but not the recall identifier R or the secret identifier S;

storing the email message and the tracking identifier T;

receiving a track command including the secret identifier S but not the recall identifier R or the tracking identifier T, using the secret identifier S to compute the tracking identifier T, using the tracking identifier T to verify that a sender of the track command is authorized, and performing a tracking operation in response to determining that the sender of the track command is authorized;

receiving a recall command including the recall identifier R but not the tracking identifier T or the secret identifier S, using the recall identifier R to compute the tracking identifier T, using the tracking identifier T to verify that a sender of the recall command is authorized, and performing a recall operation in response to determining that a sender of the recall command is authorized; and wherein performing the recall operation comprises:

cancelling transmission of the email message to the email recipient, or deleting the email message; and recording status information for the email message.

2. The method of claim 1, wherein the secret identifier S is computed, at least in part, by computing a hash of the recall identifier R, and the tracking identifier T is computed, at least in part, by computing a hash of the secret identifier S.

3. The method of claim 1, wherein the recall identifier R is computed, at least in part, by computing a hash value, the hash value is computed using a message identifier, a date for the email message, and a unique identifier for a sender of the email message.

4. The method of claim 1, further comprising:

delaying the transmission of the email message to the email recipient, based on a hold time, wherein the hold time represents a total amount of time the server is to hold the message prior to transmitting the email message to the email recipient, and the hold time is determined based, at least in part, on the email client, a destination of the email message, and a priority associated with the email message.

5. The method of claim 1, further comprising:

updating the status information for the email message, wherein the status information for the email message is updated as a result of a delivery of the email message to the email recipient, a relay of the email message to another component, a failure to deliver the email message, a relay of the email message outside a domain, a delivery of the email message to a mailing list, or a recall of the email message.

6. The method of claim 1, wherein using the tracking identifier T to verify that a sender of the recall command is authorized includes accessing status information for the email message, wherein the status information is accessed using the third tracking identifier T.

7. The method of claim 6, wherein comprising:

determining whether the recall command is received during a hold time; and in response to a determination that the recall command is received during the hold time, performing the cancelling of the transmission of the email message to the email recipient.

8. The method of claim 6, comprising:

determining whether the email message can be recalled by:

determining whether the email message or any metadata related to the email message has been accessed by the email recipient, determining whether a notification related to the email message has been received by the recipient, or determining whether a last access time of a folder comprising the email message occurs before the recall command is received.

9. The method of claim 6, wherein comprising:

determining that the email message has been relayed from a first server to a second server, based on the status information for the email message;

determining whether the second server supports recall functionality;

in response to a determination that the second server supports recall functionality, forwarding the recall command to the second server, along with the first recall identifier R; and in response to a determination that the second server does not support recall functionality, indicating that the email message cannot be successfully recalled.

10. The method of claim 6 wherein:

receiving the track command comprises receiving the track command prior to the receiving the recall command; and accessing the status information for the email message, using the tracking identifier T; and making a determination as to whether the email message should be recalled, based on the status information for the email message.

11. A computer program product comprising a plurality of instructions embodied in a non-transitory computer readable medium and executable on a computer system, wherein the instructions are configured to:

at a server separate from an email message client and an email recipient:

receive the first transmission of the email message, wherein the email message is created by the email message client, the email message is configured to be sent to the email recipient, wherein the email message client generates a recall identifier R for recalling the email message, computes, from the recall identifier R, a secret identifier S and a tracking identifier T for enabling tracking of the email message, and includes, in the first transmission of the email message, the tracking identifier T but not the recall identifier R or the secret identifier S;

store the email message and the tracking identifier T;

receive a track command including the secret identifier S but not the recall identifier R or the tracking identifier T, use the secret identifier S to compute the tracking identifier T, use the tracking identifier T to verify that a sender of the track command is authorized, and perform a tracking operation in response to determining that the sender of the track command is authorized;

receive a recall command including the recall identifier R but not the tracking identifier T or the secret identifier S, use the recall identifier R to compute the tracking identifier T, use the tracking identifier T to verify that a sender of the recall command is authorized, and perform a recall operation in response to determining that a sender of the recall command is authorized; and wherein performing the recall operation comprises:
  cancelling transmission of the email message to the recipient, or
  deleting the email message; and
record status information for the email message.

12. The computer program product of claim 11, wherein the secret identifier S is computed, at least in part, by computing a hash of the recall identifier R,
and the tracking identifier T is computed, at least in part, by computing a hash of the secret identifier S.

13. The computer program product of claim 11, wherein the recall identifier R is computed, at least in part, by computing a hash value,
the hash value is computed using
  a message identifier,
  a date for the email message, and
  a unique identifier for a sender of the email message.

14. The computer program product of claim 11, wherein the instructions are further configured to:
delay the transmission of the email message to the email recipient, based on a hold time, wherein
the hold time represents a total amount of time the server is to hold the email message prior to transmitting the email message to the email recipient, and the hold time is determined based, at least in part, on
  the email client,
  a destination of the email message, and
  a priority associated with the email message.

15. The computer program product of claim 11, wherein performing the recall operation includes
  accessing status information for the email message, wherein the status information is accessed using the tracking identifier T.

16. The computer program product of claim 15, wherein the instructions are further configured to:
  determine whether the recall command to is received during a hold time; and
  in response to a determination that the recall command is received during the hold time, perform the cancelling of the transmission of the email message to the email recipient.

17. The computer program product of claim 15, wherein the instructions are further configured to:
  determine whether the email message can be recalled by:
    determining whether the email message or any metadata related to the email message has been accessed by the email recipient,
    determining whether a notification related to the email message has been received by the recipient, or
    determining whether a last access time of a folder comprising the email message occurs before the recall command is received.

18. The computer program product of claim 15, wherein the instructions are further configured to:
  determine that the email message has been relayed from a first server to a second server, based on the status information for the email message;
  determine whether the second server supports recall functionality;
  in response to a determination that the second server supports recall functionality,
    forward the recall command to the second server, along with the recall identifier R; and
  in response to a determination that the second server does not support recall functionality, indicate that the email message cannot be successfully recalled.

19. A computer system comprising:
a server separate from an email message client and an email recipient:
the server including one or more processors;
the server further including a computer-readable storage medium coupled to the one or more processors; and
the server further including a plurality of instructions, encoded in the computer-readable storage medium, configured to cause the one or more processors to
  receive the first transmission of the email message, wherein the email message is created by the email message client, the email message is configured to be sent to the email recipient, wherein the email message client generates a recall identifier R for recalling the email message, computes, from the recall identifier R, a secret identifier S and a tracking identifier T for enabling tracking of the email message, and includes, in the first transmission of the email message, the tracking identifier T but not the recall identifier R or the secret identifier S;
  store the email message and the tracking identifier T;
  receive a track command including the secret identifier S but not the recall identifier R or the tracking identifier T, use the secret identifier S to compute the tracking identifier T, use the tracking identifier T to verify that a sender of the track command is authorized, and perform a tracking operation in response to determining that the sender of the track command is authorized;
  receive a recall command including the recall identifier R but not the tracking identifier T or the secret identifier S, use the recall identifier R to compute the tracking identifier T, use the tracking identifier to verify that a sender of the recall command is authorized, and perform a recall operation in response to determining that a sender of the recall command is authorized; and wherein performing the recall operation comprises:
    cancelling transmission of the email message to the recipient, or
    deleting the email message; and
  record status information for the email message.

20. The computer system of claim 19, wherein performing the recall operation includes
accessing status information for the email message, wherein the status information is accessed using the tracking identifier T.

* * * * *

UNITED STATES PATENT AND TRADEMARK OFFICE
CERTIFICATE OF CORRECTION

PATENT NO. : 9,979,692 B2
APPLICATION NO. : 14/640926
DATED : May 22, 2018
INVENTOR(S) : Freed et al.

Page 1 of 1

It is certified that error appears in the above-identified patent and that said Letters Patent is hereby corrected as shown below:

In the Specification

In Column 10, Line 14, after "command)" insert -- . --.

In the Claims

In Column 21, Line 67, in Claim 6, before "tracking" delete "third".

In Column 22, Line 28, in Claim 9, before "recall" delete "first".

In Column 23, Line 44, in Claim 16, before "is" delete "to".

Signed and Sealed this
Sixth Day of November, 2018

Andrei Iancu
*Director of the United States Patent and Trademark Office*